United States Patent
Murakami et al.

(10) Patent No.: US 9,406,001 B2
(45) Date of Patent: Aug. 2, 2016

(54) IMAGE PROCESSING APPARATUS, IMAGE FORMING APPARATUS, IMAGE FORMING METHOD, AND RECORDING MEDIUM

(71) Applicant: Sharp Kabushiki Kaisha, Osaka-shi, Osaka (JP)

(72) Inventors: Yoshinori Murakami, Osaka (JP); Makio Gotoh, Osaka (JP); Masanori Minami, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/438,700

(22) PCT Filed: Oct. 15, 2013

(86) PCT No.: PCT/JP2013/077966
§ 371 (c)(1),
(2) Date: Apr. 27, 2015

(87) PCT Pub. No.: WO2014/069233
PCT Pub. Date: May 8, 2014

(65) Prior Publication Data
US 2015/0286906 A1    Oct. 8, 2015

(30) Foreign Application Priority Data

Oct. 31, 2012 (JP) .................................. 2012-240775

(51) Int. Cl.
*G06K 15/02* (2006.01)
*G06K 15/00* (2006.01)
*G06K 15/12* (2006.01)
(Continued)

(52) U.S. Cl.
CPC ............ *G06K 15/1868* (2013.01); *G06K 15/12* (2013.01); *G06K 15/4065* (2013.01);
(Continued)

(58) Field of Classification Search
CPC ............. G06K 15/1868; G06K 15/12; G06K 15/4065; H04N 1/393; H04N 1/0071; H04N 1/00713; H04N 1/00779; H04N 2201/0091

USPC ........................................................... 358/1.2
See application file for complete search history.

(56) References Cited

U.S. PATENT DOCUMENTS 5,019,916 A * 5/1991 Ogura ................ H04N 1/00007
                                                             358/401
6,088,138 A * 7/2000 Sakai ....................... B41J 2/525
                                                             358/448

(Continued)

FOREIGN PATENT DOCUMENTS

JP        10-193735 A        7/1998
JP        2002-232708 A      8/2002

(Continued)

OTHER PUBLICATIONS

Official Communication issued in International Patent Application No. PCT/JP2013/077966, mailed on Jan. 21, 2014.

*Primary Examiner* — Allen H Nguyen
(74) *Attorney, Agent, or Firm* — Keating & Bennett, LLP

(57) ABSTRACT

The present invention includes: an image size detection section detecting an image size according to image data including a photograph; a paper size detection section detecting a paper size for printing the image; and an enlarging/reducing unit carrying out an enlarging/reducing process to the image data, the enlarging/reducing unit comparing the image size with the paper size and carrying out the enlarging/reducing process by selecting, between a first enlarging/reducing ratio which is a first ratio of a short side length of the paper to a short side length of the image and a second enlarging/reducing ratio which is a second ratio of a long side length of the paper to a long side length of the image, one of the first enlarging/reducing ratio and the second enlarging/reducing ratio which one is to be reduced by a ratio greater than a ratio by which the other one is to be reduced.

6 Claims, 8 Drawing Sheets

(51) Int. Cl.
*H04N 1/393* (2006.01)
*H04N 1/00* (2006.01)

(52) U.S. Cl.
CPC ......... *H04N1/0071* (2013.01); *H04N 1/00713* (2013.01); *H04N 1/00779* (2013.01); *H04N 1/393* (2013.01); *H04N 2201/0091* (2013.01)

(56) References Cited

U.S. PATENT DOCUMENTS

| | | | |
|---|---|---|---|
| 7,123,851 B2* | 10/2006 | Tomita | G03G 15/5062 399/17 |
| 8,614,824 B2* | 12/2013 | Arai | G06F 3/1205 358/1.15 |
| 8,879,114 B2* | 11/2014 | Sawada | H04N 1/3875 358/1.2 |
| 2003/0103145 A1* | 6/2003 | Ejima | H04N 1/00005 348/207.2 |
| 2004/0239959 A1 | 12/2004 | Yada et al. | |
| 2004/0247359 A1 | 12/2004 | Koto et al. | |
| 2005/0104848 A1* | 5/2005 | Yamaguchi | G06F 1/1626 345/156 |

FOREIGN PATENT DOCUMENTS

| | | |
|---|---|---|
| JP | 2006-215962 A | 8/2006 |
| JP | 2008-254330 A | 10/2008 |
| WO | 03/026277 A1 | 3/2003 |

* cited by examiner

IMAGE PROCESSING APPARATUS, IMAGE FORMING APPARATUS, IMAGE FORMING METHOD, AND RECORDING MEDIUM

TECHNICAL FIELD

The present invention relates to (i) an image processing apparatus for printing a photograph image in an appropriate layout, (ii) an image forming apparatus including the image processing apparatus, and (iii) a method of forming an image.

BACKGROUND ART

Examples of methods of carrying out borderless printing of input image data using, for example, an inkjet multifunction printer encompass a method disclosed in Patent Literature 1. According to the method disclosed in Patent Literature 1, a borderless print image is formed by (i) enlarging an input document so as to be larger than a size of output paper and (ii) printing the input document.

CITATION LIST

Patent Literature

Patent Literature 1
International Publication No. WO2003/026277, Pamphlet

SUMMARY OF INVENTION

Technical Problem

A conventional technique as the one described above causes no problem when a size of output paper fits a size of an image of input image data. In a case where the size of the output paper is less than the size of the image of the input image data, however, the image printed may unnecessarily have a missing (unprinted) part (area).

The following discusses this problem in more detail. A photograph document that can be used as input image data comes in various sizes, as shown in Table 1. These sizes serve as input document sizes, i.e., image sizes.

TABLE 1

| Print | Size (mm) | Remarks |
|---|---|---|
| L | 89 × 127 | |
| DSC | 89 × 119 | Size for usual digital camera |
| KG (Postal Card) | 102 × 152 | |
| HV (High Vision) | 89 × 158 | Size having ratio identical to ratio of TV screen |
| P (Panorama) | 89 × 254 | |
| 2L | 127 × 178 | |
| DSCW | 127 × 169 | |
| 6P | 203 × 254 | |
| A5 | 148 × 210 | |
| 6PW | 203 × 305 | |
| A4 | 210 × 297 | |
| 4P | 254 × 305 | |
| 4PW | 254 × 366 | |

On the other hand, output paper on which an image is to be printed is not prepared corresponding to the various sizes of the photograph documents. Rather, output paper of typical sizes is often set in an image forming apparatus. Accordingly, a size of an input document (input document size) may not always fit a size of output paper (output paper size).

For example, in a case where (i) only a long side of an input document is longer than a long side of output paper and (ii) borderless printing is carried out by enlarging the size of the input document so as to be larger than the size of the output paper in a manner similar to Patent Literature 1, a portion of the input document which portion is not printed on the output paper increases. Specifically, in a case where output paper of an L size (89 mm×127 mm) and an input document of a panorama size (89 mm×254 mm) are used to carry out the borderless printing of the input document in a manner similar to Patent Literature 1, approximately a half of an image of the input document is left out.

The present invention has been made in view of the problems, and an object of the present invention is to provide (i) an image processing apparatus which is capable of printing an image in an appropriate layout without unnecessarily missing a part of the image, even in a case where the image, which is in accordance with image data including a photograph, does not fit a size of paper on which the image is to be printed, (ii) an image forming apparatus including the image processing apparatus, and (iii) a method of forming an image.

Solution to Problem

In order to attain the object, an image processing apparatus in accordance with an aspect of the present invention is an image processing apparatus which carries out, with respect to image data including a photograph, image processing for printing an image according to the image data by a printing apparatus, including: an image size detection section configured to detect a size of the image according to the image data; a paper size detection section configured to detect a size of paper on which the image according to the image data is to be printed; and an enlarging/reducing section configured to (i) compare the size of the image detected by the image size detection section with the size of the paper detected by the paper size detection section and (ii) carry out an enlarging/reducing process with respect to the image data, the enlarging/reducing section comparing the size of the image with the size of the paper and carrying out the enlarging/reducing process by selecting, between a first enlarging/reducing ratio which is a first ratio of a short side length of the paper to a short side length of the image and a second enlarging/reducing ratio which is a second ratio of a long side length of the paper to a long side length of the image, one of the first enlarging/reducing ratio and the second enlarging/reducing ratio which one is to be reduced by a ratio greater than a ratio by which the other one is to be reduced. Note that one of the first enlarging/reducing ratio and the second enlarging/reducing ratio which one is to be reduced by a ratio greater than a ratio by which the other one is to be reduced is, in other words, a ratio which is to be reduced using a smaller enlarging/reducing ratio than that for the other ratio.

In order to attain the object, an image forming apparatus in accordance with an aspect of the present invention includes the image processing apparatus of the present invention.

In order to attain the object, a method of forming an image in accordance with an aspect of the present invention is a method of forming an image for printing, on paper, image data including a photograph, including the steps of (i) comparing a size of an image according to the image data with a size of paper on which the image is to be printed and (ii) carrying out an enlarging/reducing process by selecting, between a first enlarging/reducing ratio which is a first ratio of a short side length of the paper to a short side length of the image and a second enlarging/reducing ratio which is a second ratio of a long side length of the paper to a long side length of the image, one of the first enlarging/reducing ratio and the second enlarging/reducing ratio which one is to be reduced by a ratio greater than a ratio by which the other one is to be reduced.

In order to attain the object, a recording medium in accordance with an aspect of the present invention is a computer-readable storage medium storing a program for causing a computer to function as the enlarging/reducing section of the image processing apparatus of the present invention.

Advantageous Effects of Invention

An aspect of the present invention makes it possible to print an image in an appropriate layout without unnecessarily missing a part of the image, even in a case where the image, which is in accordance with image data including a photograph, does not fit a size of paper on which the image is to be printed.

Figure 6:
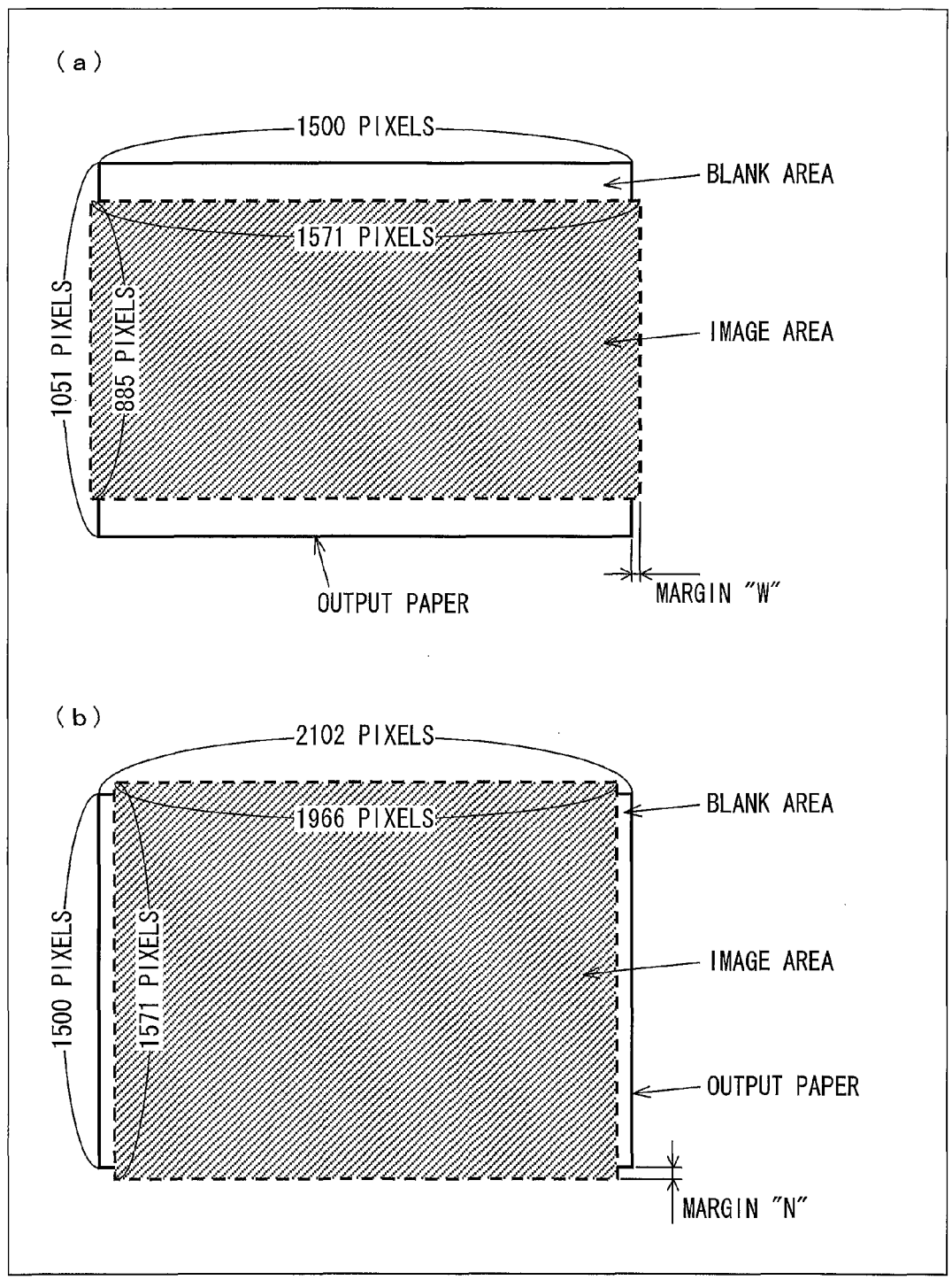

(a) and (b) of FIG. 6 are each a diagram illustrating a size of output paper and a size of an image to be printed on the output paper.

Figure 1:
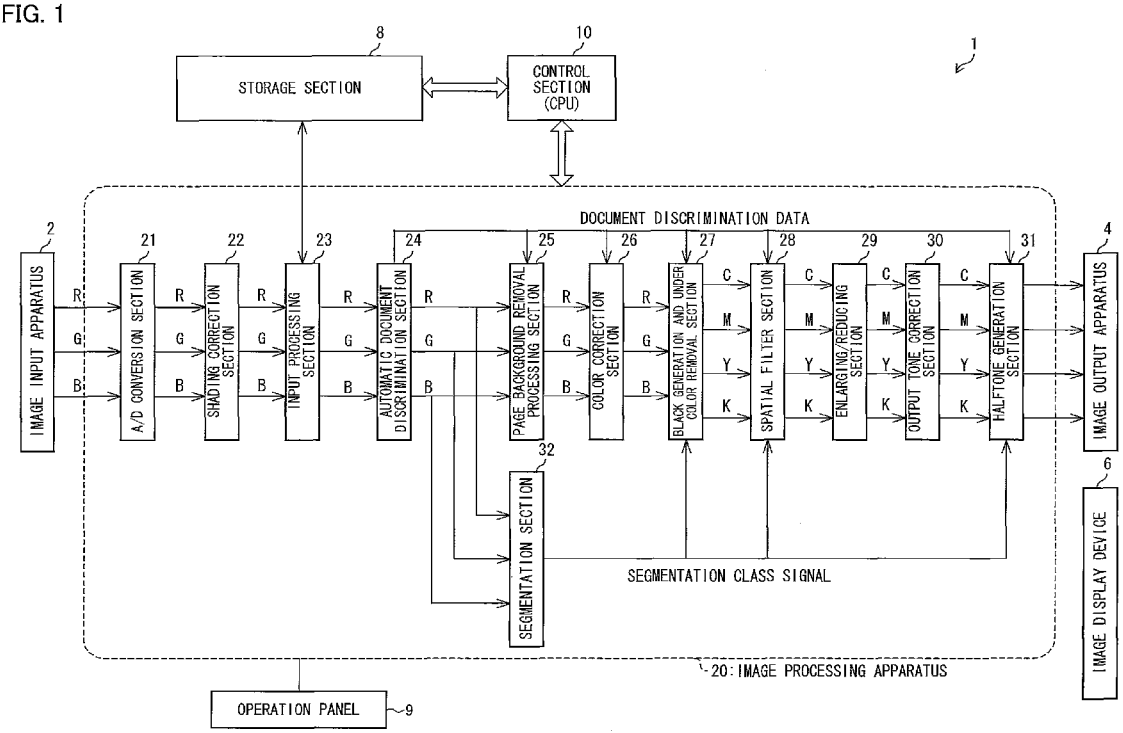
FIG. 1 is a diagram illustrating a configuration of a digital color image forming apparatus in accordance with an embodiment of the present invention and illustrates a flow of image data in a case where an image to be printed is printed in a copy mode.
Figure 7:
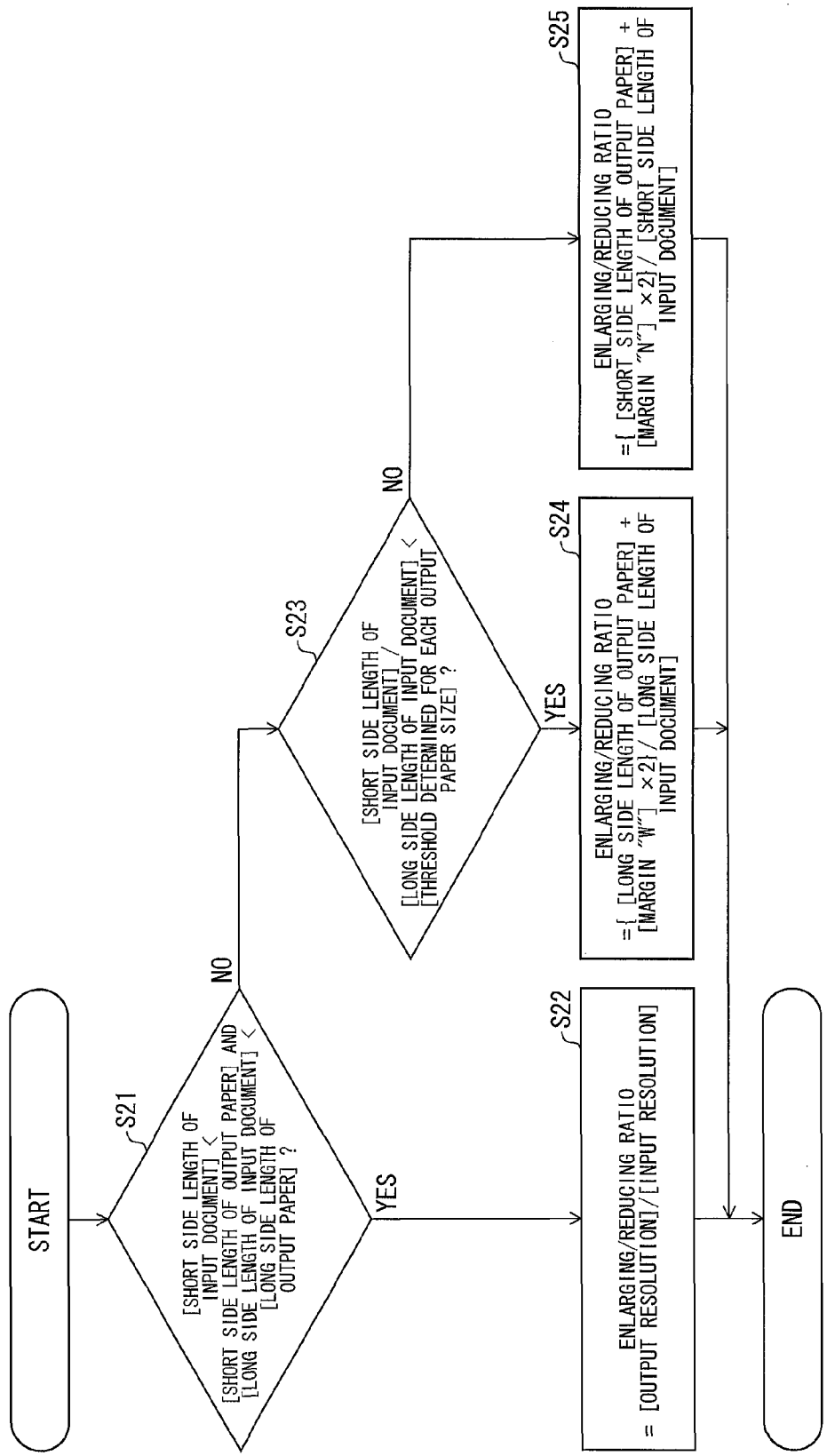

FIG. 7 is a flow chart illustrating a procedure of an enlarging/reducing process that is carried out by an enlarging/reducing unit of an aspect of the present invention in a case where a long side length and a short side length of an input document size is smaller than a long side length and a short side length of an output paper, the enlarging/reducing unit including (i) an enlarging/reducing section and (ii) a control section of the image forming apparatus illustrated in FIG. 1.

Figure 8:
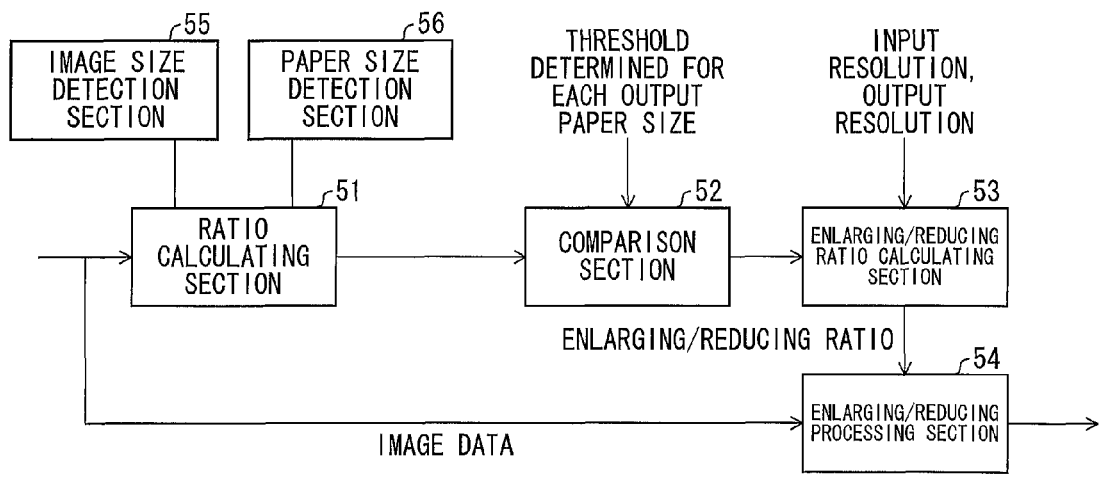

FIG. 8 is a block diagram illustrating an enlarging/reducing unit of an aspect of the present invention, the enlarging/reducing unit including an enlarging/reducing section and a control section of the image forming apparatus illustrated in FIG. 1.

Figure 9:
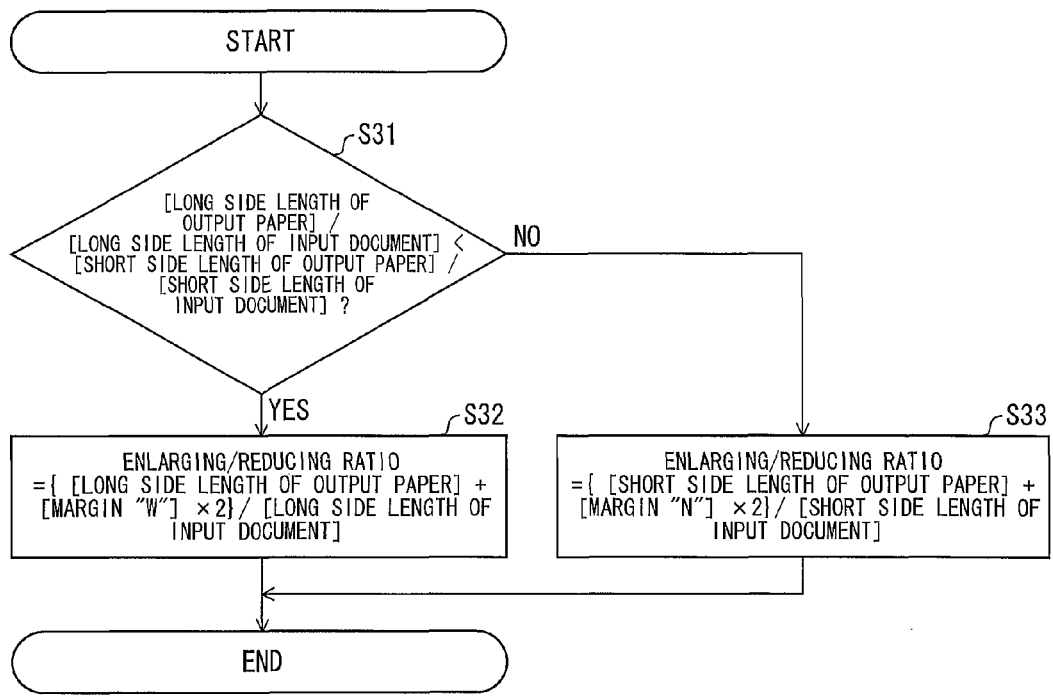

FIG. 9 is a flow chart illustrating a procedure of an enlarging/reducing ratio calculating process that is carried out by an enlarging/reducing unit of a variation of an aspect of the present invention, the enlarging/reducing unit including an enlarging/reducing section and a control section of the image forming apparatus illustrated in FIG. 1.

Figure 10:
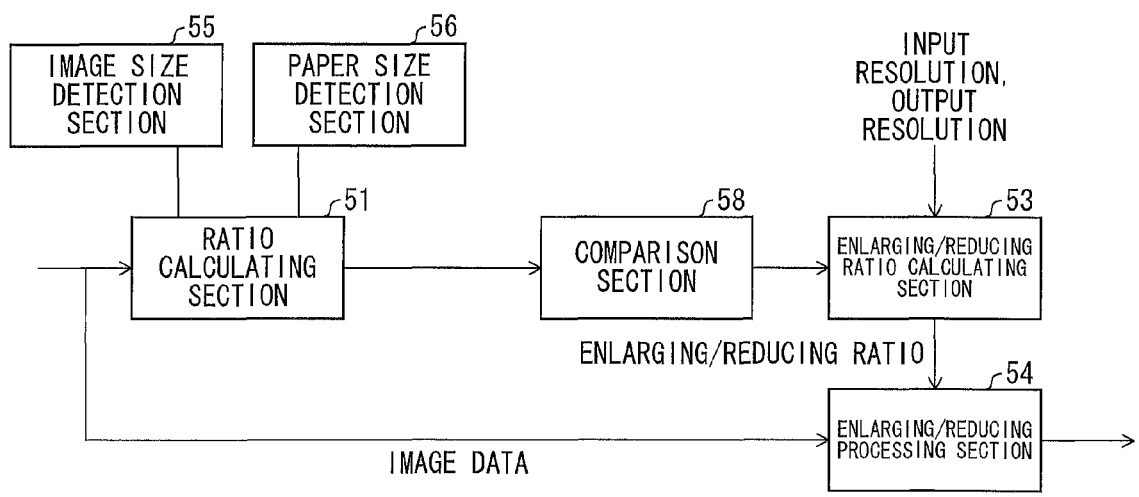

FIG. 10 is a block diagram illustrating an enlarging/reducing unit of a variation of an aspect of the present invention, the enlarging/reducing unit including an enlarging/reducing section and a control section of the image forming apparatus illustrated in FIG. 1.

DESCRIPTION OF EMBODIMENTS

The following discusses in detail an embodiment of the present invention.

<Description of Image Forming Apparatus>

FIG. 1 is a diagram illustrating a configuration of a digital color image forming apparatus 1 as an embodiment in accordance with the present invention. FIG. 1 illustrates a flow of image data in a case where an image to be printed is printed in a copy mode. The digital color image forming apparatus 1 includes an image input apparatus 2, an image output apparatus 4, an image display device 6, a storage section 8, an operation panel 9, a control section (CPU: Central Processing Unit) 10, and an image processing apparatus 20. The following discusses processes which are carried out by the above respective members when a user selects the copy mode.

The image input apparatus 2 includes a CCD (Charge Coupled Device) line sensor, and converts light reflected from a document into electric signals of R (red), G (green), and B (blue) color components. Color image signals (RGB analog signals) inputted from the CCD line sensor are inputted to the image processing apparatus 20.

The image processing apparatus 20 includes an A/D (analog/digital) conversion section 21, a shading correction section 22, an input processing section 23, an automatic document discrimination section 24, a page background removal processing section 25, a color correction section 26, a black generation and under color removal section 27, a spatial filter section 28, an enlarging/reducing section 29, an output tone correction section 30, a halftone generation section 31, and a segmentation section 32.

Color image signals (RGB analog signals) inputted to the image processing apparatus 20 are converted into digital signals by the A/D conversion section 21. Then, various types of distortions, which are generated in an illumination system, an image focusing system, and an imaging sensing system of the image input apparatus 2, are removed by the shading correction section 22. Subsequently, a process such as a y correction process is carried out with respect to each of the RGB signals by the input processing section 23.

Data outputted from the input processing section 23 (i) is supplied to the storage section 8 which includes, for example, a hard disk and (ii) is managed as filing data. In this case, for example, the image data is compressed into a JPEG code in accordance with a JPEG compression algorithm and is then stored. In a case where a copy output operation or a print output operation is instructed, the JPEG code is drawn out from the storage section 8 and is supplied to a JPEG decoding (decompression) section (not illustrated). A decoding process is then carried out with respect to the JPEG code so that the JPEG code is converted into RGB data.

On the other hand, in a case where an image transmission operation is instructed, the JPEG code is drawn out from the storage section 8 and is supplied to the JPEG decoding (decompression) section (not illustrated). The decoding process is then carried out with respect to the JPEG code so that the JPEG code is converted into RGB data. The RGB data is then converted into a PDF file. The PDF file is attached to an e-mail by an e-mail processing section (not illustrated) and transmitted to an external connection apparatus or a communication line via a network or a communication line. Note that the control section 10 carries out management of the filing data and control of an operation of supplying the data. Further, it is possible to employ a configuration in which image data, which has been processed by the automatic document discrimination section 24 (described later), is filed.

The automatic document discrimination section carries out an automatic color selection (ACS) process, which is a process for discriminating, in accordance with input image data, whether a read document is a color document or a black and white document. The automatic document discrimination section 24 further carries out a determination process such as (i) a process for determining whether or not the read document is a blank document (whether or not the read document is a blank page document), (ii) a process for determining whether a type of the read document is a text document, a printed photograph document, or a text/printed photograph document in which a text and a printed photograph are mixed, and (iii) a process for determining a page background density of the read document (page background detection).

The segmentation section 32 carries out a process for determining a region (e.g., a black text, a color text, or a halftone dot) of each pixel of the input image data. A segmentation class signal, which is obtained as a result of region segmentation, is outputted to each of the black generation and under color removal section 27, the spatial filter section 28, and the halftone generation section 31, each of which operates in a later stage.

The page background removal processing section 25 carries out a page background removal process in accordance with (i) a result of the determination carried out by the automatic document discrimination section 24 and (ii) a degree of page background removal which degree is inputted by a user from the user operation panel 9.

The color correction section 26 carries out a process in which CMY (C: Cyan; M: Magenta; Y: Yellow) signals, which are complementary colors of the RGB signals, are generated and color reproducibility is improved. The black generation and under color removal section 27 convers the CMY signals into CMYK (K: black) four-color signals. The spatial filter section 28 carries out an edge enhancement process and a smoothing process with respect to the CMYK signals.

The enlarging/reducing section 29 carries out an enlarging/reducing (zooming) process in accordance with (i) a zoom ratio which has been specified by a user or (ii) a zoom ratio which has been predetermined for an N in 1 function (2 in 1, 4 in 1, etc.) or borderless printing. Note, however, that the enlarging/reducing section 29 may carry out no process with respect to input image data depending on an enlarging/reducing ratio (when the enlarging/reducing ratio is 100%). Though specifically described later, in a case where photograph copying or photograph printing is to be carried out, the enlarging/reducing section 29 (i) compares a size of an image with a size of paper on which the image is to be printed and (ii) carries out the enlarging/reducing process using, as a reference, one of a short side and a long side of the image which one is to be reduced by a ratio greater than a ratio by which the other one is to be reduced (i.e., carrier out the enlarging/reducing process selecting, between a first enlarging/reducing ratio which is a first ratio of a short side length of the paper to a short side length of the image and a second enlarging/reducing ratio which is a second ratio of a long side length of the paper to a long side length of the image, one of the first enlarging/reducing ratio and the second enlarging/reducing ratio which one is to be reduced by a ratio greater than a ratio by which the other one is to be reduced).

The output tone correction section 30 carries out an output γ correction process for printing an image on a recording medium such as paper. The halftone generation section 31 carries out a tone reproduction process for outputting an image.

The CMYK signals outputted from the halftone generation section 31 are supplied to the image output apparatus 4, and an output image is formed. The image output apparatus 4 is an apparatus which reproduces images, such as an electrophotographic printer, an ink jet printer, or a sublimation printer.

In a case where a sublimation printer is used as the image output apparatus 4, the color correction section 26 carries out a process in which RGB signals are converted into R'G'B' signals in accordance with an output characteristic of the sublimation printer. In this case, the black generation and under color removal section 27 and the halftone generation section 31 each carry out no process. In the sublimation printer, the R'G'B' signals inputted are converted into CMY image data by a printer driver, and a tone (pixel value) is expressed for each pixel of the CMY image data.

It is possible to employ a configuration in which (i) an electrophotographic printer and a sublimation printer are each included as the image output apparatus 4 and (ii) in a case where a user selects photograph copying mode (in which a photograph is read by a scanner and outputted) or photograph printing mode (in which, for example, electronic data of a photograph stored in a USB memory is read out and outputted), the sublimation printer outputs the photograph.

The operation panel 9 receives various instructions inputted to the image forming apparatus 1. In a case where a user inputs a size of an input document, the operation panel 9 functions, together with the control section 10, as an image size detection section which detects a size of an image according to image data. Further, in a case where a user specifies output paper, the operation panel 9 functions, together with the control section 10, as a paper size detection section which detects a size of paper on which an image according to image data is to be printed.

Figure 2:
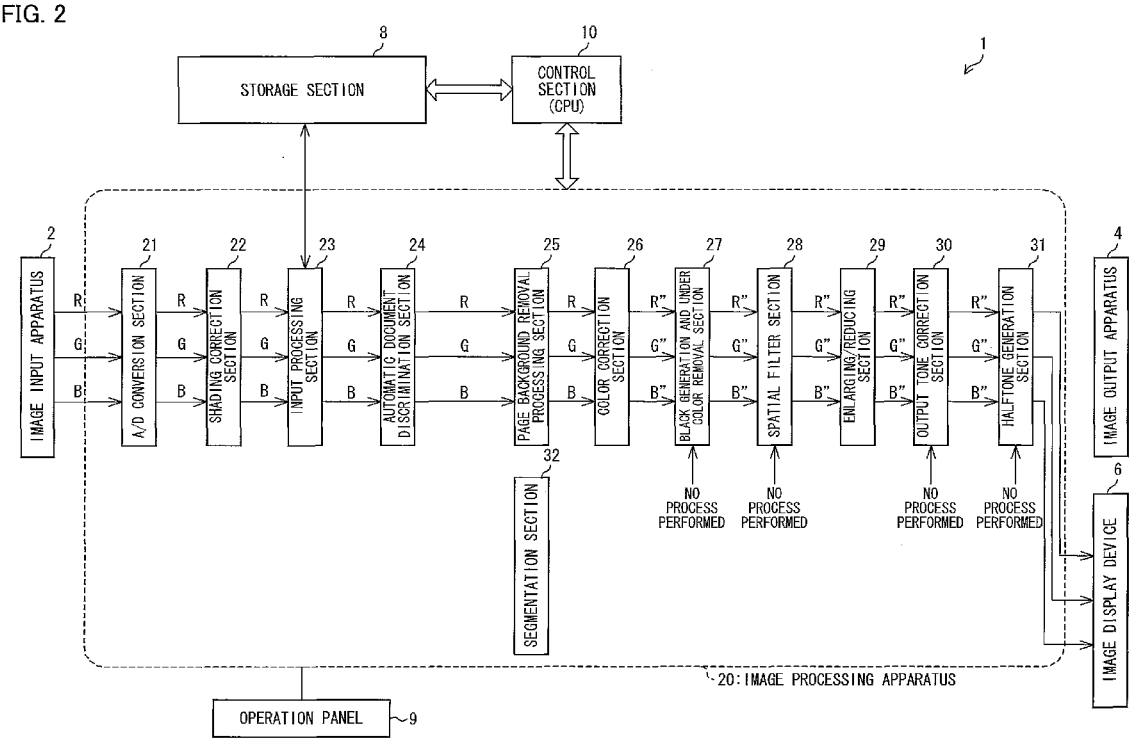
FIG. 2 is a diagram illustrating the configuration of the image forming apparatus illustrated in FIG. 1 and illustrates a flow of image data in a case where preview display is carried out in a copy mode and a full color mode.

FIG. 2 is a diagram illustrating the configuration of the image forming apparatus 1 as with FIG. 1. FIG. 2 illustrates (i) a process which is carried out by each block of the image processing apparatus 20 in a case where an image to be printed is displayed in preview in a copy mode and (ii) a flow of image data when preview display is carried out in a copy mode and a full color mode.

Note that, in the preview display, the A/D conversion section 21, the shading correction section 22, the input processing section 23, the automatic document discrimination section 24, and the page background removal processing section 25 each carry out a process in a manner identical to the printing process, and therefore a description on each process is omitted.

In a case where a full color mode has been selected, the color correction section 26 carries out a process in which RGB image data outputted from the page background removal processing section 25 is converted into R"G"B" image data which conforms to a display characteristic of the image display device 6. Note that the process in which the RGB image data is converted into the R"G"B" image data can be carried out by (i) preparing an LUT (look up table) in which input values (RGB) are associated with output values (R"G"B") and (ii) looking up the output values from the LUT prepared.

When image data is displayed in preview, the black generation and under color removal section 27 and the spatial filter section 28 each carry out no process and supply the image data as it is to a subsequent processing section (carry out no process with respect to the image data).

The enlarging/reducing section 29 carries out an enlarging/reducing process in accordance with (i) a zoom ratio which has been specified by a user or (ii) a zoom ratio which has been predetermined for an N in 1 function (2 in 1, 4 in 1, etc.) or borderless printing (this process is described later in detail).

The output tone correction section 30 and the halftone generation section 31 each carry out no process with respect to R"G"B" image data outputted from the enlarging/reducing section 29. The image data is supplied as it is to the image display device 6 which operates in a later stage, and a preview image is then displayed.

<Description on Enlarging/Reducing Unit>

In a case where photograph copying or photograph printing is to be carried out, the enlarging/reducing section 29 and the control section 10 (i) compare a size of an image with a size of paper on which the image is to be printed and (ii) carry out an enlarging/reducing process using, as a reference, one of a short side and a long side of the image which one is to be reduced by a ratio greater than a ration by which the other one is to be reduced (i.e., carry out an enlarging/reducing process by selecting, between a first enlarging/reducing ratio which is a first ratio of a short side length of the paper to a short side length of the image and a second enlarging/reducing ratio which is a second ratio of the long side length of the paper to a long side length of the image, one of the first enlarging/reducing ratio and the second enlarging/reducing ratio which one is to be reduced by a ratio greater than a ratio by which the other one is to be reduced). An enlarging/reducing unit of an aspect of the present invention includes the enlarging/reducing section 29 and the control section 10. The following first discusses a condition for determining that photograph copying or photograph printing is to be carried out. Note that the control section 10 carries out the determination.

When photograph printing mode is selected from the operation panel 9, the control section 10 of the image forming apparatus 1 determines that photograph printing is to be carried out. In a case of photograph printing, the number of pixels is used to calculate a ratio using lengths of a short side and a long side of an image that is in accordance with the image data (this process is described later).

On the other hand, the control section 10 of the image forming apparatus 1 determines that photograph copying is to be carried out, in any of the following cases (a) through (c):
(a) Photograph copying mode is selected from the operation panel 9;
(b) A standard size of a photograph such as L, 2L, or 4P is selected as an output paper size from the operation panel 9;
(c) The automatic document discrimination section 24 carries out a document type discrimination process and determines that an image is a photograph document or a text/photograph document (in top or bottom of a photograph, for example, a text is inserted).

It is possible to employ a configuration in which in a case where (i) no selection is carried out from the operation panel 9 unlike the cases (a) and (b) and (ii) the automatic document discrimination section 24 carries out the document type discrimination process and determines that an image is a photograph document or a text/photograph document, a user is prompted to input an instruction whether or not to carry out a process for photograph copying, specifically, an instruction whether or not to carry out an enlarging/reducing process using, as a reference, one of a short side and a long side of the image which one is to be reduced by a ratio greater than a ratio by which the other one is to be reduced (an enlarging/reducing process to be carried out by selecting, between a first enlarging/reducing ratio which is a first ratio of a short side length of the paper to a short side length of the image and a second enlarging/reducing ratio which is a second ratio of a long side length of the paper to a long side length of the image, one to be reduced by a ratio greater than a ratio by which the other one is to be reduced).

The following discusses a case where photograph copying is carried out with respect to a photograph (document) or a text/photograph (document). Note, however, that photograph copying is not limited to a photograph (document) or a text/photograph (document). It is also possible to carry out photograph copying, for example, with respect to a printed photograph or a text/printed photograph (e.g., a clipping from a newspaper or a magazine).

As a method of discriminating a document type by the automatic document discrimination section 24, for example, a method disclosed in Japanese Patent Application Publication, Tokukai, No. 2002-232708 can be employed.

(1) A minimum density value (pixel value) and a maximum density value in a block of n×m (e.g., 7×15) pixels including a target pixel are calculated.

(2) The minimum density value and the maximum density value calculated are used to calculate a maximum density difference.

(3) A total density busyness (e.g., a sum of (i) absolute values of density differences between respective adjacent pixels in a main scanning direction and (ii) absolute values of density differences between respective adjacent pixels in a sub-scanning direction), which is a sum total of absolute values of density differences between respective adjacent pixels, is calculated.

(4) The maximum density difference calculated is compared with a maximum density difference threshold. Further, the total density busyness calculated is compared with a total density busyness threshold. In a case where a condition that (i) the maximum density difference is less than the maximum density difference threshold and (ii) the total density busyness is less than the total density busyness threshold is satisfied, the automatic document discrimination section 24 determines that the target pixel belongs to a page background region or a photograph region. In a case where the above condition is not satisfied, the automatic document discrimination section 24 determines that the target pixel belongs to a text region or a halftone dot region.

(5) In a case where the target pixel, which has been determined in the step (4) to belong to the page background region or the photograph region, satisfies a condition that the maximum density difference is less than a threshold for determination between a page background and a photograph, the automatic document discrimination section 24 determines that the target pixel is a page background pixel. In a case where the target pixel does not satisfy the above condition, the automatic document discrimination section 24 determines that the target pixel is a photograph (continuous tone region) pixel.

(6) In a case where the target pixel, which has been determined in the step (4) to belong to the text region or the halftone dot region, satisfies a condition that the total density busyness is less than a value which is obtained by multiplying the maximum density difference by a threshold for determination between a text and a halftone dot, the automatic document discrimination section 24 determines that the target pixel is a text pixel. In a case where the target pixel does not satisfy the above condition, the automatic document discrimination section 24 determines that the target pixel is a halftone dot pixel.

(7) The number of pixels, which have been determined to belong to each of the page background region, the photograph region, the text region, and the halftone dot region, is counted so as to obtain count values for respective of the page background region, the photograph region, the text region, and the halftone dot region. The count values for the page background region, the photograph region, the text region, and the halftone dot region are compared with predetermined thresholds for the page background region, the photograph region, the halftone dot region, and the text region, respectively. In this way, the automatic document discrimination section 24 determines a type of the entire document. For example, in a case where accuracy in detecting each of the text region, the halftone dot region, and the photograph region decreases in this order, the automatic document discrimination section 24 determines a type of the document in the following manner. That is, in a case where a ratio of the number of pixels belonging to the text region to a total number of pixels is not less than 30%, the automatic document discrimination section 24 determines that the document is a text document. In a case where a ratio of the number of pixels belonging to the halftone dot region to the total number of pixels is not less than 20%, the automatic document discrimination section 24 determines that the document is a halftone dot document (printed photograph document). In a case where a ratio of the number of pixels belonging to the photograph region to the total number of pixels is not less than 10%, the automatic document discrimination section 24 determines that the document is a photograph document. Further, in a case where the ratio of the text region and the ratio of the halftone dot region are not less than the threshold for the text region and the threshold for the halftone dot region, respectively, the automatic document discrimination section 24 determines that the document is a text/halftone dot document (text/printed photograph document).

FIG. 8 is a block diagram illustrating an enlarging/reducing unit, which includes the enlarging/reducing section 29 and the control section 10, of an aspect of the present invention.

An image size detection section 55 detects an input document size which is a size of an image according to image data. A paper size detection section 56 detects an output paper size which is a size of paper on which the image according to the image data is to be printed. A ratio calculating section 51 calculates, in accordance with the input document size, a ratio of [input document short side length]/[input document long side length] (third ratio), which is a ratio of a short side length of an input document to a long side length of the input document. A comparison section 52 compares the ratio of [input document short side length]/[input document long side length] calculated by the ratio calculating section 51 with a threshold for each output paper size which threshold (i) is determined in accordance with an output paper size and (ii) is a ratio of a short side length of the output paper to a long side length of the output paper. As a result of the comparison carried out by the comparison section 52, in a case where the ratio of [input document short side length]/[input document long side length] is less than the threshold determined for each output paper size, an enlarging/reducing ratio calculating section 53 calculates an enlarging/reducing ratio in accordance with the long side length of the output paper and the long side length of the input document. In a case where the ratio of [input document short side length]/[input document long side length] is not less than the threshold determined for each output paper size, the enlarging/reducing ratio calculating section 53 calculates an enlarging/reducing ratio in accordance with the short side length of the output paper and the short side length of the input document. An input resolution and an output resolution are each inputted to the enlarging/reducing ratio calculating section 53. The enlarging/reducing ratio calculating section 53 calculates the enlarging/reducing ratio by taking into account the input resolution and the output resolution which affect the enlarging/reducing ratio. The enlarging/reducing ratio calculated is inputted to an enlarging/reducing processing section 54. The enlarging/reducing processing section 54 then carries out an enlarging/reducing process with respect to the image data using the enlarging/reducing ratio calculated by the enlarging/reducing ratio calculating section 53.

Figure 3:
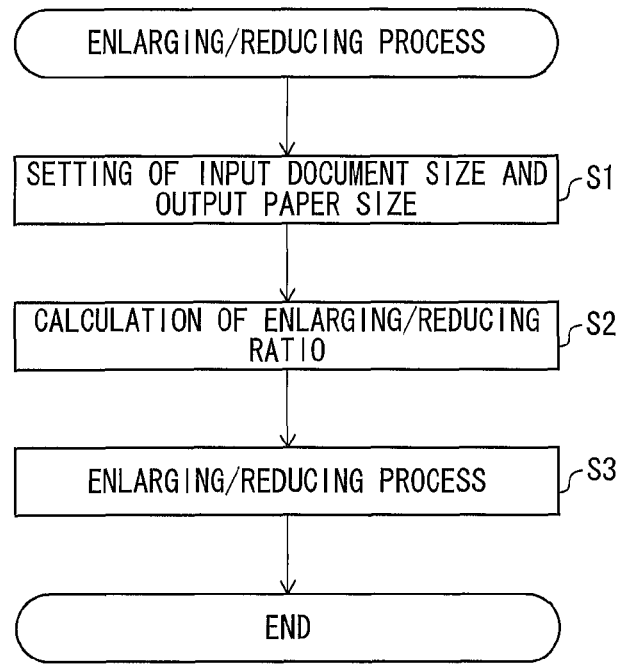
FIG. 3 is a flow chart illustrating a procedure of an enlarging/reducing process that is carried out by an enlarging/reducing unit of an aspect of the present invention, the enlarging/reducing unit including an enlarging/reducing section and a control section of the image forming apparatus illustrated in FIG. 1.

A flow chart in FIG. 3 illustrates a procedure of an enlarging/reducing process that is carried out by the enlarging/reducing unit which includes the enlarging/reducing section 29 and the control section 10. In the enlarging/reducing process, an enlarging/reducing ratio is calculated in accordance with an input document size and an output paper size. The control section 10 obtains the input document size and the output paper size and sets these sizes (S1), and calculates an enlarging/reducing ratio (S2). The enlarging/reducing section 29 then carries out the enlarging/reducing process (S3).

As described above, the input document size can be detected in accordance with an input from the operation panel 9. Alternatively, the input document size can be detected, for example, by the following method.

First, a signal converting process and a binalization process are carried out with respect to input image data. The signal converting process of the input image data (conversion of the input image data into a luminance value) can be carried out, for example, by the following Formula 1, where color components of the input image data are InR, InG, and InB. When (i) a threshold for the binalization is set to, for example, 200 and (ii) an output value "Out" in Formula 1 is used as an input value, it is only necessary that (a) 0 be outputted in a case where the input value is not less than 200 and (b) 1 be outputted in a case where the input value is less than 200.

$$\text{Out}=\text{In}R\times0.3+\text{In}G\times0.59+\text{In}B\times0.11 \qquad \text{Formula 1}$$

Figure 4:
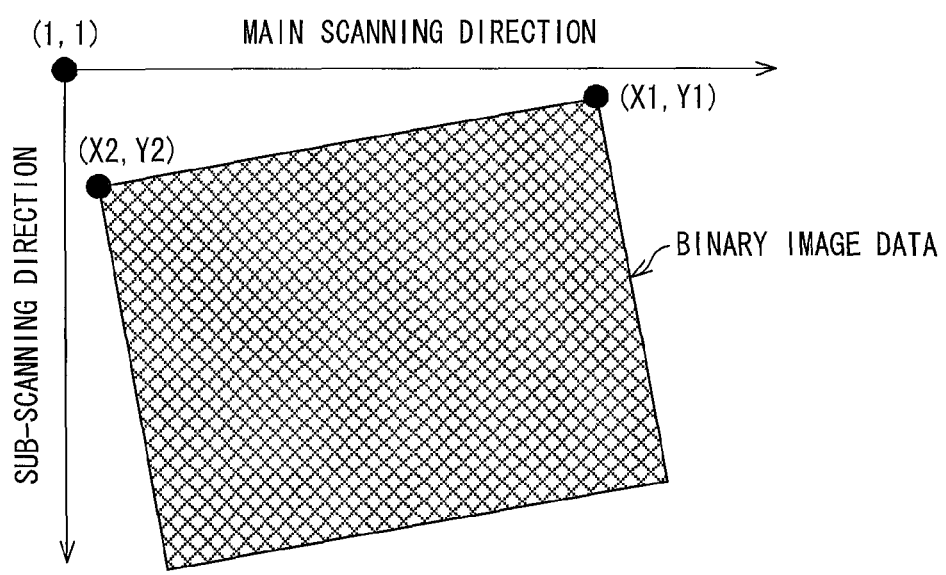
FIG. 4 is a diagram illustrating an example of calculating of a skew in accordance with a binary image by the image forming apparatus illustrated in FIG. 1.

Next, a skew is calculated in accordance with a binary image. As illustrated in FIG. 4, two vertices (X1,Y1) and (X2,Y2) of vertices of the binary data (binary image data) are obtained, and a skew α is calculated by the following Formula 2.

The following specifically explains a calculation of the skew α.

(i) In a case where x indicates a pixel in a main scanning direction, y indicates a pixel in a sub-scanning direction, Xwidth and Ywidth indicate an image size in the main scanning direction and an image size in the sub-scanning direction, respectively, and F(x,y) indicates a density value of a pixel (x,y), it is determined, from a pixel in an upper left position (x=1,y=1) of an image and in the main scanning direction, whether or not a value of F(x,y) is 1. In a case where the value of F(x,y) is not 1, the determination is continued in the main scanning direction until the determination is completed with respect to a whole of Xwidth. When the determination is completed with respect to the whole of Xwidth, the determination is continued by shifting by one (1) pixel in the sub-scanning direction, and a pixel which satisfies F(x,y)=1 is set as Xl, Y1.

(ii) Next, it is determined, from the pixel in the upper left position (x=1,y=1) of the image and in the sub-scanning direction, whether or not a value of F(x,y) is 1. In a case where the value of F(x,y) is not 1, the determination is continued in the sub-scanning direction until the determination is completed with respect to a whole of Ywidth.

When the determination is completed with respect to the whole of Ywidth, the determination is continued by shifting by one (1) pixel in the main scanning direction, and a pixel which satisfies F(x,y)=1 is set as X2, Y2.

(iii) The skew α is calculated by the following Formula 2 in accordance with (X1,Y1) and (X2,Y2) which have been calculated in the steps (i) and (ii), respectively.

$$\alpha=(Y2-Y1)/(X2-X1)$$ Formula 2

(iv) The skew α calculated is compared with a predetermined threshold Thα (e.g., 0.05=approximately 5 degrees). In a case where the skew α is not less than the threshold, it is determined that a skew is present. In a case where the skew α is less than the threshold, it is determined that no skew is present.

In a case where it is determined by the above process that a skew is present, the skew is corrected. Then, the number of pixels in the main scanning direction and the number of pixels in the sub-scanning direction are calculated. An input document size is then determined in accordance with a relationship, which has been predetermined for a reading resolution, between (i) the number of pixels in the main scanning direction and the number of pixels in the sub-scanning direction and (ii) the input document size.

Specifically, as illustrated in Table 2, for example, a table in which sizes of typical photograph documents are associated with the number of pixels of the typical photograph documents, is prepared and held in advance for a reading resolution. In a case where it is determined by the above process that a skew is present, the skew is corrected, and the number of pixels, in the main scanning direction, of the image data and the number of pixels, in the sub-scanning direction, of the image data are calculated. Then, (i) a difference between (a) the number of pixels, in the main scanning direction, of the image data and (b) the number of pixels, in the main scanning direction, shown in Table 2 and (ii) a difference between (A) the number of pixels, in the sub-scanning direction, of the image data and (B) the number of pixels, in the sub-scanning direction, shown in Table 2 are calculated. Further, such a size in Table 2 that both the numbers of pixels in the main scanning direction and the sub-scanning direction have the minimum differences from the numbers of pixels of the image data in the main scanning direction and the sub-scanning direction is determined to be a size of the input document.

Note that in a case where a resolution is set to a value which differs from 600 dpi (a resolution is set to 600 dpi in a case shown in Table 2), the number of pixels is calculated by correcting the skew using a ratio of the resolution to 600 dpi. The input document size is then determined by a method similar to the above method. Alternatively, the input document size can be calculated by (i) dividing each of the number of pixels calculated in the main scanning direction and the number of pixels calculated in the sub-scanning direction by the resolution so as to obtain values and then (ii) converting the values in inches into millimeters.

TABLE 2

| Print | Size (mm) | The Number of Pixels |
|---|---|---|
| L | 89 × 127 | 2102 × 3000 |
| DSC | 89 × 119 | 2102 × 2811 |
| KG (Postal Card) | 102 × 152 | 2409 × 3591 |
| HV (High Vision) | 89 × 158 | 2102 × 3732 |
| P (Panorama) | 89 × 254 | 2102 × 6000 |
| 2L | 127 × 178 | 3000 × 4205 |
| DSCW | 127 × 169 | 3000 × 3992 |
| 6P | 203 × 254 | 4795 × 6000 |
| A5 | 148 × 210 | 3496 × 4961 |
| 6PW | 203 × 305 | 4795 × 7205 |
| A4 | 210 × 297 | 4961 × 7016 |
| 4P | 254 × 305 | 6000 × 7205 |
| 4PW | 254 × 366 | 6000 × 8646 |

Resolution: 600 dpi

Alternatively, the input document size can be determined in such a manner that a photodetector such as a phototransistor is provided in the image input apparatus 2 so that a photograph in a standard size is detected.

Alternatively, as described above, it is possible to employ a configuration in which a user is prompted to input an input document size from the operation panel 9. The input document size can be inputted by a method in which the user selects a name corresponding to the input document size out of names of print sizes, such as L, 2L, 4P, panorama, B5, and A4, which are displayed on the operation panel 9. Alternatively, the input document size can be inputted by a method in which the user (i) checks a size of an input document using graduations in millimeters which are printed on a member provided on an edge of a glass surface, on which a document is to be placed, of a scanner platen and then (ii) inputs, in millimeter units from the operation panel 9, actual sizes, in respective portrait and landscape orientations, of the input document.

On the other hand, an output paper size is a standard size, such as L, 2L, and 4P, of a photograph (i) which standard size is selected from the operation panel 9 and (ii) in which standard size an image can be printed.

Figure 5:
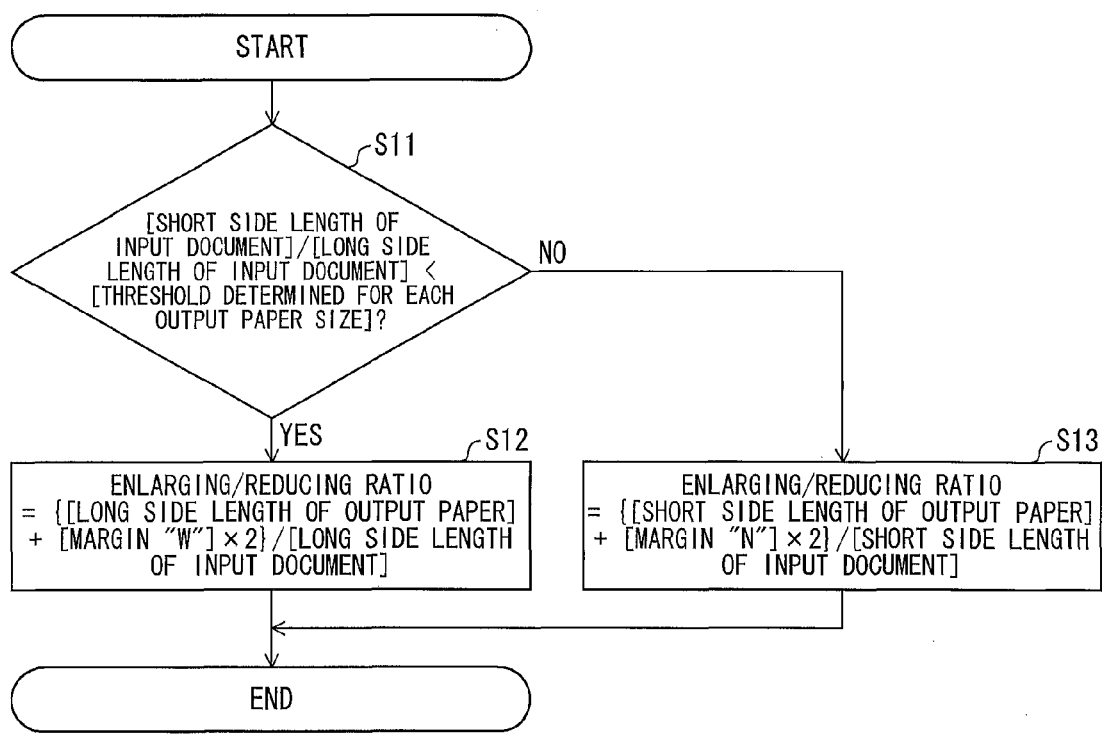
FIG. 5 is a flow chart illustrating a procedure of an enlarging/reducing ratio calculating process that is carried out by an enlarging/reducing unit of an aspect of the present invention, the enlarging/reducing unit including an enlarging/reducing section and a control section of the image forming apparatus illustrated in FIG. 1.

In S2 in the flow chart illustrated in FIG. 3, an enlarging/reducing ratio is calculated in accordance with the input document size and the output paper size which are determined as described above. FIG. 5 is a flow chart illustrating a procedure of an enlarging/reducing ratio calculating process which is carried out by an enlarging/reducing unit of an aspect of the present invention.

In this case, a ratio of [input document short side length]/[input document long side length], which is a ratio (third ratio) of a short side length of an input document to a long side length of the input document, is calculated in accordance with an input document size (size of image). The ratio of [input document short side length]/[input document long side length] calculated is then compared with a threshold for each output paper size which threshold is determined in accordance with an output paper size (size of paper) (S11). In a case where the ratio of [input document short side length]/[input document long side length] is less than the threshold determined for each output paper size, an enlarging/reducing ratio is calculated in accordance with a long side length of output paper and a long side length of the input document (S12, second enlarging/reducing ratio). In a case where the ratio of [input document short side length]/[input document long side length] is not less than the threshold determined for each output paper size, the enlarging/reducing ratio is calculated in accordance with a short side length of the output paper and a short side length of the input document (S13, first enlarging/reducing ratio).

The threshold for each output paper size, which is determined in accordance with the output paper size (size of paper), is, as described above, a ratio of the short side length of the output paper to the long side length of the output paper. Further, in S12 and S13, an enlarging/reducing ratio is set by taking a margin into consideration.

The following explains specific examples.

SPECIFIC EXAMPLE 1

In a case where an input document size is HV (89 mm×158 mm) and an output paper size is L (89 mm×127 mm), a ratio of a short side length (89 mm) of an input document to a long side length (158 mm) of the input document is calculated (ratio calculating section, see FIG. 8). The ratio calculated is then compared with a threshold 0.7008 for output paper L (a ratio of [short side length of output paper L]/[long side length of output paper L]=89/127) (comparison section 52).

Since the ratio of [input document short side length]/[input document long side length]=89 mm/158 mm=0.5633 and 0.5633 is less than a threshold 0.7008, an enlarging/reducing ratio is calculated such that {[output paper long side length]+[margin "W"]×2}/[input document long side length] (enlarging/reducing ratio calculating section 53).

Note here that the margin "W" is set so that a printing apparatus, which is the image output apparatus 4, is always capable of outputting an image such that the image outputted has no border appearing in a long side direction, even in a case where a position of paper supplied is displaced from a specified position due to mechanical accuracy of a paper feeding mechanism. The margin "W" is set to, for example, 3 mm. In this case, the enlarging/reducing ratio=(127+3×2)/158=0.8418.

Note that in a case where the input resolution and the output resolution are identical to each other and are both 300 dpi, the enlarging/reducing ratio is 0.8418 as it is. In a case where the input resolution is 600 dpi and the output resolution is 300 dpi, however, the enlarging/reducing ratio is 0.4209, which is a half of 0.8418. The input resolution and the output resolution can be set from the operation panel 9 of the image forming apparatus. In a case where no new setting for the input resolution and the output resolution is carried out, default values for the input resolution and the output resolution are set. In a case where a scanner or a printer is connected to a computer via a USB cable or a network, the input resolution and the output resolution can be set from a window for setting a reading condition of the scanner and a window for setting a printing condition of the printer.

SPECIFIC EXAMPLE 2

In a case where an input document size is 6P (203 mm×254 mm) and an output paper size is 2L (127 mm×178 mm), a ratio of a short side length (203 mm) of an input document to a long side length (254 mm) of the input document is calculated. The ratio calculated is then compared with a threshold 0.7135 for output paper 2L.

Since the ratio of [input document short side length]/[input document long side length]=203 mm/254 mm=0.7992 and 0.7992 is less than 0.7135, an enlarging/reducing ratio is calculated such that {[output paper short side length]+[margin "N"]×2}/[input document short side length]. Note here that the margin "N" is set so that a printing apparatus, which is the image output apparatus 4, is always capable of outputting an image so that the image outputted has no border appearing in a short side direction, even in a case where a position of paper supplied is displaced from a specified position due to mechanical accuracy of the paper feeding mechanism. The margin "N" is set to, for example, 3 mm. In this case, the enlarging/reducing ratio=(127+3×2)/203=0.6552.

Note that in a case where the input resolution and the output resolution are identical to each other and are both 300 dpi, the enlarging/reducing ratio is 0.6552 as it is. In a case where the input resolution is 600 dpi and the output resolution is 300 dpi, however, the enlarging/reducing ratio is 0.3276, which is a half of 0.6552.

In this manner, an enlarging/reducing ratio is calculated, and then the enlarging/reducing process is carried out in accordance with the enlarging/reducing ratio. Note that the enlarging/reducing process is carried out by a publicly well-known interpolation method such as "nearest neighbor," "bi-linear," or "bi-cubic."

In Specific Example 1, in a case where (i) the input document size is HV (89 mm×158 mm) and the output paper size is L (89 mm×127 mm) and (ii) the input resolution is 600 dpi and the output resolution is 300 dpi, the enlarging/reducing ratio is 0.4209. In this case, an input image has 2102 pixels and 3732 pixels in the short side and the long side, respectively. When these pixels are each multiplied by 0.4209, an output image has 885 pixels and 1571 pixels in the short side and the long side, respectively, as illustrated in (a) of FIG. 6. Accordingly, the output image is partially unprinted on a side of the long side for the margin "W"×2, but is entirely printed on a side of the short side. In this manner, a copy image of the input document is printed in a maximum size on the output paper so that no important part of the input document is left out.

In Specific Example 2, in a case where (i) the input document size is 6P (203 mm×254 mm) and the output paper size is 2L (127 mm×178 mm) and (ii) the input resolution is 600 dpi and the output resolution is 300 dpi, the enlarging/reducing ratio is 0.3276. In this case, an input image has 4795 pixels and 6000 pixels in the short side and the long side, respectively. When these pixels are each multiplied by 0.3276, an output image has 1571 pixels and 1966 pixels in the short side and the long side, respectively, as illustrated in (b) of FIG. 6. Accordingly, the output image is partially unprinted on a side of the short side for the margin "N"×2, but is entirely printed on a side of the long side. In this manner, a copy image of the input document is printed in a maximum size on the output paper so that no important part of the input document is left out.

As described above, in a case where photograph copying or photograph printing is to be carried out, the enlarging/reducing section 29 and the control section 10 (i) compare a size of an image with a size of paper on which the image is to be printed and (ii) carry out the enlarging/reducing process using, as a reference, one of a short side and a long side of the image which one is to be reduced by a ratio greater than a ratio by which the other one is to be reduced (the enlarging/reducing process to be carried out by selecting, between a first enlarging/reducing ratio which is a first ratio of a short side length of paper to a short side length of the image and a second enlarging/reducing ratio which is a second ratio of a long side length of the paper to a long side length of the image, one of the first enlarging/reducing ratio and the second enlarging/reducing ratio which one is to be reduced by a ratio greater than a ratio by which the other one is to be reduced). Accordingly, the image of the input document may be printed such that (i) either an upper part and a lower part of the image of the input document or a right part and a left part of the image of the input document are left out and (ii) white frame parts are formed on the output paper. However, most part of the original image is printed so as to appropriately fit in the output paper.

On the other hand, in a case where the input document size is smaller than the output paper size in both of the long side and the short side, an enlarging/reducing ratio can be calculated by a method which differs from the above method. A flow chart in FIG. 7 illustrates a procedure of an enlarging/reducing process that is carried out by the enlarging/reducing section 29 and the control section 10 in a case where the input document size is smaller than the output paper size in both of the long side and the short side.

In a case where (i) the short side of the input document is shorter than the short side of the output paper and (ii) the long side of the input document is shorter than the long side of the output paper, an enlarging/reducing ratio=[output resolution]/[input resolution]. For example, in a case where the input resolution and the output resolution are both 300 dpi, the enlarging/reducing ratio is 1 and therefore no enlarging/reducing process needs to be carried out. In a case where the input resolution is 600 dpi and the output resolution is 300 dpi, the enlarging/reducing ratio is 0.5.

In a case where (i) the short side of the input document is not shorter than the short side of the output paper or (ii) the long side of the input document is not shorter than the long side of the output paper, the enlarging/reducing ratio is calculated by carrying out the process in which the ratio of [input document short side length]/[input document long side length] is compared with the threshold determined for each output paper size. As described above, in a case where the input document is smaller than the output paper, the image can be printed in a size identical to that of the input document.

Note that a user may select output paper which has an unnecessarily large size that allows an input document enlarged two times to be printed on the output paper. In order to deal with such a case, the following process can be carried out after an input document size is determined. That is, it is possible to employ a configuration in which a message, which recommends a small output paper size to a user, is displayed by the image display device. Alternatively, it is possible to employ a configuration in which when a user is selecting output paper, the user cannot select unnecessarily large output paper. In this example, the following process can be carried out. That is, for example, prescanning is carried out so that a size of an input document is determined, and a user then selects output paper. Alternatively, the input document is enlarged so as to fit in the output paper and a user is notified that an enlarging process is recommended to be carried out. Alternatively, the output paper size and the input document size are displayed so as to draw a user's attention.

Further, in a case where the image display device 6 illustrated in FIG. 2 is connected to the image processing apparatus 20, before the image output apparatus 4 outputs (prints) an image, the image display device 6 displays a preview image which is to be printed on the output paper. The preview display is based on the above enlarging/reducing ratio. Since the number of pixels of the output paper differs from the number of pixels of the output paper displayed in preview, an enlarging/reducing ratio for the preview display is calculated by multiplying the enlarging/reducing ratio for outputting (printing) by a ratio of [the number of pixels of the output paper displayed in preview]/[the number of pixels of the output paper].

For example, in an example illustrated in (a) of FIG. 6, in a case where (i) L is selected as a size of output paper, (ii) an output resolution for printing is 300 dpi, (iii) output paper has 1500 pixels in a long side, and (iv) output paper for preview display has 375 pixels in a long side, a ratio 0.1052, which is obtained by multiplying the enlarging/reducing ratio 0.4209 for printing by 0.25 (=375/1500), is an enlarging/reducing ratio for the preview display.

The enlarging/reducing process is carried out in accordance with the enlarging/reducing ratio, so that image data for the preview display is generated and is then displayed in preview. A user can change, from the operation panel 9, the enlarging/reducing ratio from an initial state of the preview display, as needed. Even in a case where the user changes the enlarging/reducing ratio, the image for the preview display is generated by multiplying the enlarging/reducing ratio by 0.25. Then, in response to an output instruction inputted by the user from the operation panel 9, a copy image (i) is generated in accordance with the enlarging/reducing ratio finally set (enlarging/reducing ratio which has not been multiplied by 0.25) and (ii) then printed.

<Description of Enlarging/Reducing Unit of Variation>

FIG. 10 is a block diagram illustrating an enlarging/reducing unit of a variation of an aspect of the present invention.

An image size detection section 55 detects an input document size which is a size of an image according to image data. A paper size detection section 56 detects an output paper size which is a size of paper on which the image according to the image data is to be printed. In accordance with the input document size and the output paper size, a ratio calculating section 51 calculates (i) a ratio of [output paper long side length]/[input document long side length] (long side length ratio, second enlarging/reducing ratio), which is a ratio of a long side of output paper to a long side of an input document and (ii) a ratio of [output paper short side length]/[input document short side length] (short side length ratio, first enlarging/reducing ratio), which is a ratio of a short side length of the output paper to a short side length of the input document. A comparison section (determination section) 58 determines which is smaller between the ratio of [output paper long side length]/[input document long side length] calculated by the ratio calculating section 51 and the ratio of [output paper short side length]/[input document short side length] calculated by the ratio calculating section 51. An enlarging/reducing ratio calculating section 53 calculates an enlarging/reducing ratio in accordance with a ratio which has been determined to be smaller between the above two ratios by the comparison section 58. The enlarging/reducing ratio calculated is inputted to an enlarging/reducing processing section 54. The enlarging/reducing processing section 54 then carries out an enlarging/reducing process with respect to the image data using the enlarging/reducing ratio calculated by the enlarging/reducing ratio calculating section 53.

A flow chart in FIG. 9 illustrates a procedure of an enlarging/reducing ratio calculating process which is carried out by an enlarging/reducing unit of a variation of an aspect of the present invention.

In this case, (i) a ratio of [output paper long side length]/[input document long side length] (long side length ratio), which is a ratio of a long side length of output paper to a long side length of an input document, and (ii) a ratio of [output paper short side length]/[input document short side length] (short side length ratio), which is a ratio of a short side length of the output paper to a short side length of the input document, are calculated in accordance with an input document size (size of image) and an output paper size (size of paper). The ratio of [output paper long side length]/[input document long side length] calculated is then compared with the ratio of [output paper short side length]/[input document short side length] calculated (S31). In a case where the ratio of [output paper long side length]/[input document long side length] is less than the ratio of [output paper short side length]/[input document short side length], an enlarging/reducing ratio is calculated in accordance with the long side length of the output paper and the long side length of the input document (S32). In a case where the ratio of [output paper long side length]/[input document long side length] is not less than the ratio of [output paper short side length]/[input document short side length], the enlarging/reducing ratio is calculated in accordance with the short side length of the output paper and the short side length of the input document (S33). Also in this case, the enlarging/reducing ratio is set by taking a margin into consideration in S32 and S33.

The following discusses specific examples.

SPECIFIC EXAMPLE 3

In a case where an input document size is HV (89 mm×158 mm) and an output paper size is L (89 mm×127 mm), (i) a ratio of a long side length (127 mm) of output paper to a long side length (158 mm) of an input document and (ii) a ratio of a short side length (89 mm) of the output paper to a short side length (89 mm) of the input document are calculated (ratio calculating section 51). The above two ratios are then compared with each other (comparison section 58).

Since the ratio of [output paper long side length]/[input document long side length]=127 mm/158 mm=0.80308, the ratio of [output paper short side length]/[input document short side length]=89 mm/89 mm=1. That is, the ratio of the long side length (127 mm) of the output paper to the long side length (158 mm) of the input document is less than the ratio of the short side length (89 mm) of the output paper to the short side length (89 mm) of the input document. Accordingly, an enlarging/reducing ratio is calculated in accordance with the information on the long sides. The enlarging/reducing ratio is calculated such that {[output paper long side length]+[margin "w"]×2)}/[input document long side length] (enlarging/reducing ratio calculating section 53).

In this case, the enlarging/reducing ratio=(127+3×2)/158=0.8418. Note that in a case where the input resolution and the output resolution are identical to each other and are both 300 dpi, the enlarging/reducing ratio is 0.8418 as it is. In a case where the input resolution is 600 dpi and the output resolution is 300 dpi, however, the enlarging/reducing ratio is 0.4209, which is a half of 0.8418.

SPECIFIC EXAMPLE 4

In a case where an input document size is 6P (203 mm×254 mm) and an output paper size is 2L (127 mm×178 mm), (i) a ratio of a long side length (178 mm) of output paper to a long side length (254 mm) of an input document and (ii) a ratio of a short side length (127 mm) of the output paper to a short side length (203 mm) of the input document are calculated (ratio calculating section 51). The above two ratios are then compared with each other (comparison section 58).

Since the ratio of [output paper long side length]/[input document long side length]=178 mm/254 mm=0.7008, the ratio of [output paper short side length]/[input document short side length]=127 mm/203 mm=0.6256. That is, the ratio of the short side length (127 mm) of the output paper to the short side length (203 mm) of the input document is less than the ratio of the long side length (178 mm) of the output paper to the long side length (254 mm) of the input document. Accordingly, an enlarging/reducing ratio is calculated in accordance with the information on the short sides. The enlarging/reducing ratio is calculated such that {[output paper short side length]+[margin "N"]×2}/[input document short side length] (enlarging/reducing ratio calculating section 53).

In this case, the enlarging/reducing ratio=(127+3×2)/203=0.6552. Note that in a case where the input resolution and the output resolution are identical to each other and are both 300 dpi, the enlarging/reducing ratio is 0.6552 as it is. In a case where the input resolution is 600 dpi and the output resolution is 300 dpi, however, the enlarging/reducing ratio is 0.3276, which is a half of 0.6552.

CONCLUSION

An image processing apparatus in accordance with an aspect of the present invention is an image processing apparatus which carries out, with respect to image data including a photograph, image processing for printing an image according to the image data by a printing apparatus, including: an image size detection section configured to detect a size of the image according to the image data; a paper size detection section configured to detect a size of paper on which the image according to the image data is to be printed; and an enlarging/reducing unit configured to (i) compare the size of the image detected by the image size detection section with the size of the paper detected by the paper size detection section and (ii) carry out an enlarging/reducing process with respect to the image data, the enlarging/reducing unit comparing the size of the image with the size of the paper and carrying out the enlarging/reducing process by selecting, between a first enlarging/reducing ratio which is a first ratio of a short side length of the paper to a short side length of the image and a second enlarging/reducing ratio which is a second ratio of a long side length of the paper to a long side length of the image, one of the first enlarging/reducing ratio and the second enlarging/reducing ratio which one is to be reduced by a ratio greater than a ratio by which the other one is to be reduced.

The configuration allows an image including a photograph to be outputted and printed in an appropriate layout.

The image processing apparatus in accordance with the aspect of the present invention can be configured such that the enlarging/reducing unit includes: a ratio calculating section configured to calculate, in accordance with the size of the image, a third ratio which is a ratio of the short side length of the image to the long side length of the image; a comparison section configured to compare the third ratio calculated by the ratio calculating section with a threshold which (i) is determined in accordance with the size of the paper and (ii) is a ratio of the short side length of the paper to the long side length of the paper; an enlarging/reducing ratio calculating section configured to (i) calculate the second enlarging/reducing ratio as an enlarging/reducing ratio in a case where the comparison section determines that the third ratio is less than the threshold and (ii) calculate the first enlarging/reducing ratio as the enlarging/reducing ratio in a case where the comparison section determines that the third ratio is not less than the threshold; and an enlarging/reducing processing section configured to carry out an enlarging/reducing process with respect to the image data in accordance with the enlarging/reducing ratio calculated by the enlarging/reducing ratio calculating section.

The image processing apparatus in accordance with the aspect of the present invention can be configured such that the enlarging/reducing unit includes: a ratio calculating section configured to calculate, in accordance with the size of the image and the size of the paper, (i) the second enlarging/reducing ratio which is the second ratio of the long side length of the paper to the long side length of the image and (ii) the first enlarging/reducing ratio which is the first ratio of the short side length of the paper to the short side length of the image; a determination section configured to determine which is smaller between the second enlarging/reducing ratio and the first enlarging/reducing ratio, calculated by the ratio calculating section; an enlarging/reducing ratio calculating section configured to calculate an enlarging/reducing ratio in accordance with a ratio which has been determined, by the determination section, to be smaller between the second enlarging/reducing ratio and the first enlarging/reducing ratio; and an enlarging/reducing processing section configured to carry out an enlarging/reducing process with respect to the image data in accordance with the enlarging/reducing ratio calculated by the enlarging/reducing ratio calculating section.

The image processing apparatus in accordance with the aspect of the present invention can be configured such that the enlarging/reducing ratio calculating section calculates the enlarging/reducing ratio in consideration of (i) an input resolution at which the document is read and (ii) an output resolution at which the image data, with respect to which image processing is carried out, is outputted.

With the configuration, in a case where the input resolution at which the document is read differs from the output resolution at which the image data is outputted by an image output apparatus, an appropriate enlarging/reducing ratio can be set in consideration of the input resolution and the output resolution.

The image processing apparatus in accordance with the aspect of the present invention can be configured such that in a case where the comparison section (i) compares (a) a length of a short side of the document and a length of a short side of the output paper size with each other and (b) a length of a long side of the document and a length of a long side of the output paper size with each other and (ii) determines that (a) the length of the short side of the document is less than the length of the short side of the output paper size and (b) the length of the long side of the document is less than the length of the long side of the output paper size, the enlarging/reducing ratio is calculated in accordance with the input resolution and the output resolution.

With the configuration, in the case where a document size is less than an output paper size in both of a long side and a short side, the document size is basically not changed and an enlarging/reducing ratio is set in consideration of only an input resolution and an output resolution. This prevents a part of a document from not being printed.

The image processing apparatus in accordance with the aspect of the present invention can be configured such that in a case where (i) the comparison section further compares the ratio which is smaller between the above two ratios with a given value and (ii) determines that the ratio is less than the given value, the enlarging/reducing ratio is calculated in accordance with the input resolution and the output resolution.

With the configuration, in the case where a document size is less than an output paper size in both of a long side and a short side, the document size is basically not changed and an enlarging/reducing ratio is set in consideration of only an input resolution and an output resolution. This prevents a part of a document from not being printed. The given value can be set to, for example, "1." Alternatively, the given value can be set to a numerical value including an error difference, such as 0.95, in consideration of (i) an error difference in accuracy of detection of the document size and (ii) an error difference in measurement of the document size (in a case where a user measures a length of the document and inputs the length of the document).

The image processing apparatus in accordance with the aspect of the present invention can be configured to further include a document type discrimination section (automatic document discrimination section) which discriminates, in accordance with the image data, a type of the document, the enlarging/reducing unit comparing the document size with the output paper size and calculating an enlarging/reducing ratio for the image data, in a case where the document type discrimination section determines that the document includes a photograph.

With the configuration, even in a case where a user does not notice that a document does not fit in paper, it is possible to cause the document to fit a size of the paper. This suppresses an unnecessary process from being carried out.

The image processing apparatus in accordance with the aspect of the present invention can be configured to further include a notification section which notifies a user that in a case where the document type discrimination section determines that the document includes a photograph, the document size is compared with the output paper size and an enlarging/reducing ratio for the image data is then calculated.

With the configuration, it is possible to notify a user that a document may not fit in paper. This prevents an unnecessary process from being carried out in a case where the user does not notice that the document may not fit in the paper. The notification is displayed, for example, on an operation panel. The notification allows a process to be continued by prompting a user to select whether to (i) continue the process or (ii) carry out a process in which (a) the document size is compared with the output paper size and (b) an enlarging/reducing ratio for the image data is calculated.

The image processing apparatus may be realized by a computer. In this case, the present invention encompasses a computer-readable storage medium storing, in a non-transitory manner, a program which causes a computer to operate as the enlarging/reducing unit so that the image processing apparatus can be realized by the computer.

The present invention is not limited to the description of the embodiments above, but may be altered by a skilled person within the scope of the claims. An embodiment based on a proper combination of technical means disclosed in different embodiments is encompassed in the technical scope of the present invention.

[Practical Example of Software]

The present invention may be realized using a computer-readable storage medium storing a program code (execute type program, intermediate code program, and source program) to be executed by a computer, the computer-readable storage medium storing an image processing method in which an appropriate enlarging-reducing ratio, which prevents information of an input document from being missed out, is set in accordance with an input document size and an output paper size when the photograph copying described above is carried out.

This makes it possible to provide a portable storage medium storing a program for executing the image processing method.

Note that, in the present embodiment, the storage medium may be (i) a program medium such as a memory (not illustrated) (e.g., ROM) itself in order for a process to be carried out on a microcomputer or (ii) a program medium readable when the storage medium is inserted into a program reading device provided as an external storage device (not illustrated).

In either case, a stored program code may be accessed and executed by a microprocessor.

Alternatively, in either case, a system may be employed in which the program code is read out, the program code read out is downloaded to a program storage area (not illustrated) of a microcomputer, and the program code is executed. A program for downloading is stored in advance in a main body apparatus.

Note here that the program medium may be (i) a storage medium which is separable from a main body and (ii) a medium fixedly carrying a program code including any of tapes, such as a magnetic tape and a cassette tape; any of disks including magnetic disks, such as a Floppy (registered trademark) disk and a hard disk, and optical disks, such as a CD-ROM, an MO, an MD, and a DVD; any of cards, such as an IC card (including a memory card) and an optical card; or any of semiconductor memories, such as a mask ROM, an EPROM (Erasable Programmable Read Only Memory), an EEPROM (Electrically Erasable Programmable Read Only Memory, registered trademark), and a flash ROM.

The present embodiment provides a system configured to be connectable with a communication network including the Internet. Therefore, the program medium may be a medium fluidly carrying a program code so that the program code is downloaded from the communication network. Note that in a case where the program code is downloaded from the communication network in this manner, the programs for downloading may be stored in advance in the main body apparatus or may be installed from a separate storage medium. The present invention can also be implemented by the program code in the form of a computer data signal embedded in a carrier wave which is embodied by electronic transmission.

The above method of processing an image is carried out when a digital color image forming apparatus or a program reading apparatus which is provided in a computer system reads the storage medium.

INDUSTRIAL APPLICABILITY

The present invention is applicable to an image forming apparatus such as a copying machine, a multifunction printer, and a printer.

Reference Signs List

1: Digital color image forming apparatus
4: Image output apparatus
6: Image display device
8: Storage section
9: Operation panel
10: Control section (enlarging/reducing unit)
20: Image processing apparatus
24: Automatic document discrimination section
27: Black generation and under color removal section
29: Enlarging/reducing section (enlarging/reducing unit)
51: Ratio calculating section
52: Comparison section
53: Enlarging/reducing ratio calculating section
54: Enlarging/reducing processing section
55: Image size detection section
56: Paper size detection section
58: Comparison section

The invention claimed is:

1. An image processing apparatus which carries out, with respect to image data including a photograph, image processing for printing an image according to the image data by a printing apparatus, comprising:
an image size detection section configured to detect a size of the image according to the image data;
a paper size detection section configured to detect a size of paper on which the image according to the image data is to be printed; and
an enlarging/reducing unit configured to (i) compare the size of the image detected by the image size detection section with the size of the paper detected by the paper size detection section and (ii) carry out an enlarging/reducing process with respect to the image data, wherein
the enlarging/reducing unit comparing the size of the image with the size of the paper and carrying out the enlarging/reducing process by selecting, between a first enlarging/reducing ratio which is calculated in accordance with a first ratio of a short side length of the paper to a short side length of the image and a second enlarging/reducing ratio which is calculated in accordance with a second ratio of a long side length of the paper to a long side length of the image one of the first enlarging/reducing ratio and the second enlarging/reducing ratio, a selected one of the first enlarging/reducing ratio and the second enlarging/reducing ratio is to be reduced by a ratio greater than a ratio by which the other one is to be reduced,
the enlarging/reducing unit calculates each of the first enlarging/reducing ratio and the second enlarging/reducing ratio by adding a margin to a length of a side of the paper, and
the image processing apparatus positions the image with respect to the paper so that spaces are present on two outer edges of the side used to calculate the selected one of the first enlarging/reducing ratio and the second enlarging/reducing ratio, the image positioned by the image processing apparatus being generated in accordance with the image data which has been subjected to the enlarging/reducing process by the enlarging/reducing unit.

2. The image processing apparatus as set forth in claim 1, wherein the enlarging/reducing unit includes:
a ratio calculating section configured to calculate, in accordance with the size of the image, a third ratio which is a ratio of the short side length of the image to the long side length of the image;
a comparison section configured to compare the third ratio calculated by the ratio calculating section with a threshold which (i) is determined in accordance with the size of the paper and (ii) is a ratio of the short side length of the paper to the long side length of the paper;
an enlarging/reducing ratio calculating section configured to (i) calculate the second enlarging/reducing ratio as an enlarging/reducing ratio in a case where the comparison section determines that the third ratio is less than the threshold and (ii) calculate the first enlarging/reducing ratio as the enlarging/reducing ratio in a case where the comparison section determines that the third ratio is not less than the threshold; and
an enlarging/reducing processing section configured to carry out an enlarging/reducing process with respect to the image data in accordance with the enlarging/reducing ratio calculated by the enlarging/reducing ratio calculating section.

3. The image processing apparatus as set forth in claim 1, wherein the enlarging/reducing unit includes:
a ratio calculating section configured to calculate, in accordance with the size of the image and the size of the paper, (i) the second enlarging/reducing ratio which is the second ratio of the long side length of the paper to the long side length of the image and (ii) the first enlarging/reducing ratio which is the first ratio of the short side length of the paper to the short side length of the image;
a determination section configured to determine which is smaller between the second enlarging/reducing ratio and the first enlarging/reducing ratio, calculated by the ratio calculating section;
an enlarging/reducing ratio calculating section configured to calculate an enlarging/reducing ratio in accordance with a ratio which has been determined, by the determination section, to be smaller between the second enlarging/reducing ratio and the first enlarging/reducing ratio; and an enlarging/reducing processing section configured to carry out an enlarging/reducing process with respect to the image data in accordance with the enlarging/reducing ratio calculated by the enlarging/reducing ratio calculating section.

4. An image forming apparatus comprising the image processing apparatus recited in claim 1.

5. A non-transitory tangible computer-readable storage medium storing a program for causing a computer to function as the image processing apparatus recited in claim 1, the program causing the computer to function as the enlarging/reducing unit.

6. A method of forming an image for printing, on paper, image data including a photograph, comprising the steps of:
(i) comparing a size of an image according to the image data with a size of paper on which the image is to be printed, and
(ii) carrying out an enlarging/reducing process by selecting, between a first enlarging/reducing ratio which is calculated in accordance with a first ratio of a short side length of the paper to a short side length of the image and a second enlarging/reducing ratio which is calculated in accordance with a second ratio of a long side length of the paper to a long side length of the image, one of the first enlarging/reducing ratio and the second enlarging/reducing ratio which one is to be reduced by a ratio greater than a ratio by which the other one is to be reduced, wherein the first enlarging/reducing ratio and the second enlarging/reducing ratio are each calculated by adding a margin to a length of a side of the paper, and the method further comprising the step of (iii) positioning the image with respect to the paper so that spaces are left on respective both ends of the side used to calculate the selected one of the first enlarging/reducing ratio and the second enlarging/reducing ratio, the image being generated in accordance with the image data which has been subjected to the enlarging/reducing process.

\* \* \* \* \*